June 7, 1932. H. J. NEUFANG 1,861,507
LEVER
Filed Feb. 28, 1930
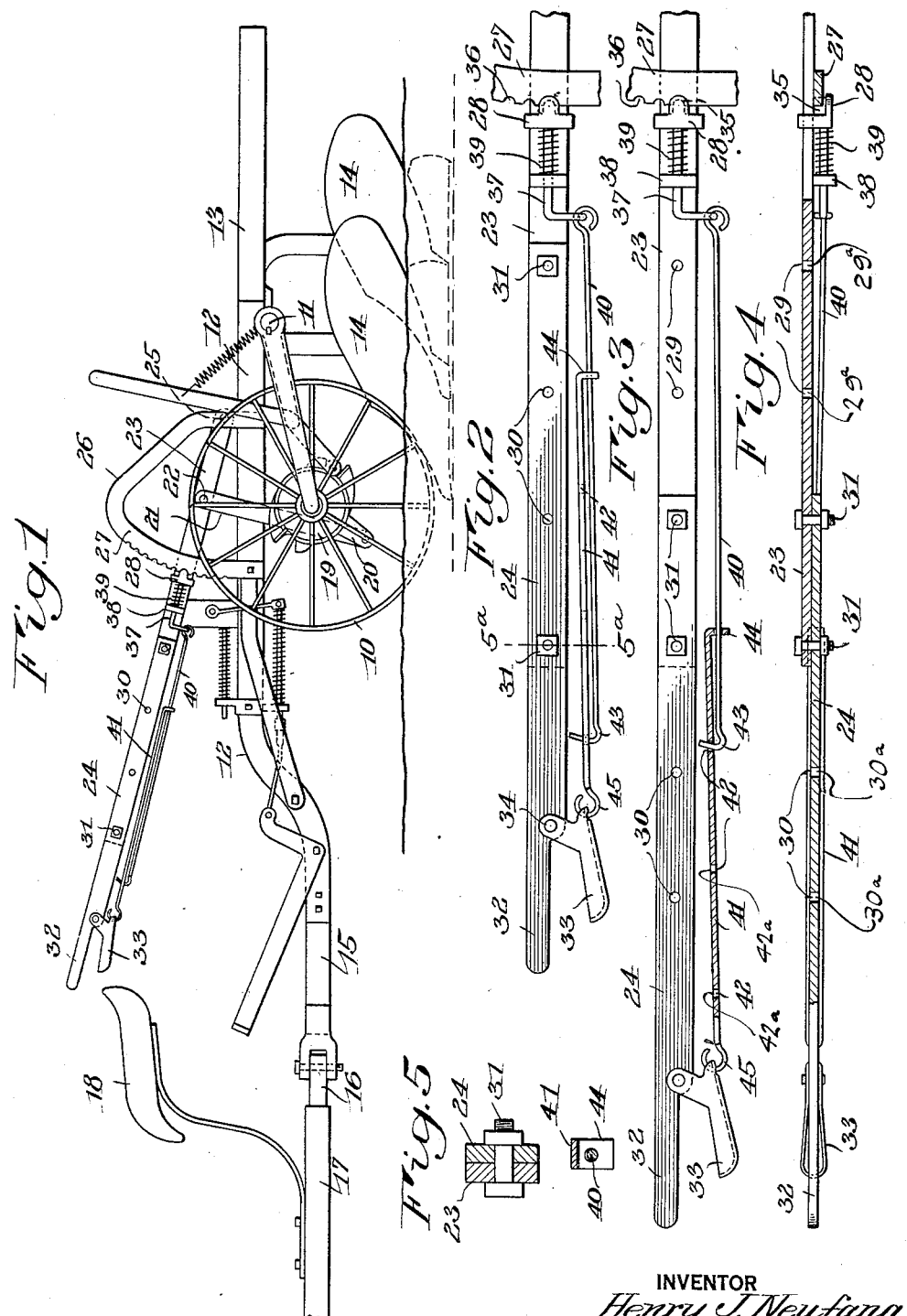
INVENTOR
Henry J. Neufang
BY
Edward H. Cumpston
his ATTORNEY Patented June 7, 1932

1,861,507

UNITED STATES PATENT OFFICE

HENRY J. NEUFANG, OF ATLANTA, NEW YORK, ASSIGNOR TO BOGGS PLOW COMPANY, INC., OF ATLANTA, NEW YORK, A CORPORATION OF NEW YORK

LEVER

Application filed February 28, 1930. Serial No. 432,246.

The present invention relates to levers and has for its object to provide an improved device of this class embodying a construction designed to permit of a variation in the length of the lever whereby to render a single lever applicable for use under varying conditions where ordinarily different levers would be required.

A further object of the invention is to provide an extensible lever of simple construction, the adjustments of which can be quickly and readily made either before or after application of the lever.

A further object of the invention is to provide an extensible lever in which both the lever proper and the latch control means are made readily extensible, the construction being such that the adjustments of one corresponds to those of the other.

To these and other ends the invention resides in certain improvements and combinations of parts, all as will be hereinafter more fully described, the novel features being pointed out in the claims at the end of the specification.

In the drawing:

Fig. 1 is a side elevation of a tractor drawn plow to which the present invention is shown applied;

Fig. 2 is a side elevation of an extensible lever embodying the invention;

Fig. 3 is a part sectional elevation showing the lever extended;

Fig. 4 is a longitudinal section through the lever showing the manner of connecting the adjustable sections thereof, and Fig. 5 is a transverse section through the lever taken on line 5a—5a of Fig. 2.

Similar reference numerals throughout the several views indicate the same parts.

The present invention is applicable for use under varying conditions where levers of different lengths are required, and it will be understood that the lever shown and described herein may be employed in connection with different types of machines or mechanisms having parts requiring the use of levers for operation thereof.

One example of the advantage of a lever of this kind is in connection with farming machinery of the type controlled or operated from the seat of a tractor where the machines are to be connected with and drawn by a tractor. In farming implements and other machines of the class adapted to be drawn by a tractor, the length of the draft beams or other draft connections varies considerably and likewise the distance between the seat of the tractor and the operating lever will also vary. The present lever is, therefore, particularly adapted for use under such conditions, since its length can readily be changed as may be required. In the present illustration the lever is shown applied to a reversible plow connected with the rear portion of a tractor, the lever being shown in position to be operated from the seat of the tractor.

Referring to the drawing, 10 represents one of the wheels of a reversible plow having a crank axle 11 for supporting the main frame 12 with which is suitably connected a second frame 13 carrying a plurality of plows 14. The main frame is provided with a draft beam 15 arranged for connection as shown in Fig. 1 with a draw bar 16 of a tractor, a portion of the tractor frame being indicated at 17 for supporting the driver's seat 18, adjacent to which the present extensible lever is positioned for control by the driver.

The plow illustrated in Fig. 1 is one of the type having a power lift mechanism such as a well known form of clutch indicated generally at 19, one portion of which is arranged to be operated by one of the wheels and the other portion being suitably connected with the crank axle 11 forming a portion of the lifting means for the frame 12. An operating arm 20 is carried by the portion of the clutch connected with the axle and connected with the arm is the lower end of a link 21 having its upper end suitably connected at 22 with the inner section 23 of the extensible lever, the adjustable outer section of which is indicated at 24. The inner section of the lever is pivoted at 25 to an arched frame member 26 having a notched segment 27 thereon for receiving the detent or latching element 28 of the lever, the arched frame member 26 being supported by the main frame 12.

The outer section 24 of the lever is alined with the inner section and is adjustable longitudinally thereof to various positions according to the length required under the particular conditions of operation or usage to which the lever may be put. The inner and outer sections are preferably provided with a plurality of spaced abutments 29a and 30a formed for example by providing in said sections the holes 29 and 30, respectively, to afford the abutments and to receive the securing devices such as the clamping bolts 31 which serve to firmly connect the lever sections in their different positions of adjustment whereby a rigid construction is afforded. The outer section is provided with a hand grip or operating portion 32, associated with which is a pivotal operating element 33 for the extensible latching mechanism hereinafter described. The latch operating element is in the form of a hand grip and is pivoted upon the outer section 24 of the lever adjacent the hand grip portion 32 thereof.

The latch or detent element 28 is slidably mounted upon the inner section 23 of the lever and has a tooth-like portion 35 arranged to take into the notches 36 of the segment 27. Connected with the latch member 28 is a plunger 37 guided by a lug 38 on the lever, between which and the member 28 is a spring 39 for holding the detent in latching position.

Interposed between the hand grip 33 and the plunger are the inner and outer extensible latch operating elements 40 and 41 respectively. The outer element is provided with a plurality of abutments 42a formed for example by providing the holes 42 in said element for detachably receiving an offset or hook-shaped portion 43 of the member 40, the latter being extended through and guided by a lug or upturned portion 44 of the member 41 as best shown in Fig. 3. The member 41 is also provided with a hook-shaped portion 45 detachably connected with the hand grip 33. The member 40 is preferably formed of heavy wire and is sufficiently flexible to permit of the withdrawal of the offset portion 43 from engagement with the abutments 42a afforded by the holes or openings in the member 41 and the opening through the lug 44 is made somewhat larger than the diameter of the rod 40 to avoid binding of the latter and to permit proper flexing of the same when withdrawing the offset portion 43 from the holes 42 to disengage it from the abutments 42a.

It will be understood that the spacings for the abutments afforded by the holes 42 in the extensible latch control member 41 are the same as those afforded by the holes 30 and abutments 30a in the outer section 24 of the lever so that for each adjustment of the latter, a corresponding adjustment of the former may be effected.

While the present illustration shows the extensible lever applied to a wheel-supported plow frame for the purpose of raising and lowering the frame, it will be understood that the lever is adaptable for use with various types of machines and it will be further understood that the invention is not limited to the particular construction shown but is intended to cover all variations or modifications falling within the scope of the appended claims.

I claim as my invention:

1. An extensible lever comprising a plurality of sections mounted for adjustment one longitudinally upon another, one of the sections having a plurality of spaced abutments and another having means for engaging said abutments to secure the sections in different adjusted positions one upon another whereby to vary the length of the lever, latching means for the lever movable upon one of the sections, an operating member pivoted upon another section and a pair of extensible connections between the operating member and the latching means for actuating the latter, one of said connections having a plurality of abutments thereon spaced to correspond to the spacings of the abutments on said lever section and also having a guide portion through which the other connection projects and the latter having an offset portion arranged to detachably engage the different abutments of the connection having the guide portion whereby said connections are held in proper adjusted relation in the different adjusted positions of the lever sections.

2. An extensible lever comprising inner and outer sections mounted for adjustment one upon another to vary the length of the lever, means for holding said sections in different adjusted positions, a spring pressed latch for the lever on the inner section, an operating hand grip on the outer section and extensible connections between the hand grip and latch for actuating the latter one of said connections having a plurality of holes therein and having a guide thereon, the other connection engaging the guide and having an offset portion for detachable engagement within said holes.

3. An extensible lever, comprising inner and outer longitudinally adjustable sections having overlapping portions disposed one upon another, each of the sections having a plurality of equally spaced abutments arranged to register one with another in different positions of adjustment of the sections, means for engaging one or more of the abutments in the different adjusted positions of the sections to secure one section upon another, a latch for the lever, and extensible operating connections for the latch having cooperating portions arranged for engagement one with another in all positions of adjustment of said lever sections.

4. An extensible lever, comprising inner and outer longitudinally adjustable sections having overlapping portions disposed one upon another, each of the sections having a plurality of equally spaced abutments arranged to register one with another in different positions of adjustment of the sections, means arranged for cooperation with certain of the abutments in all of the adjusted positions of the sections to secure one section upon another, a latch for the lever, and extensible operating connections for the latch, one of said connections having a plurality of abutments spaced to correspond to the spacings of the abutments of said lever sections, the other connection having a part arranged for engagement with the abutments of said last mentioned connection in the different adjusted positions of the lever sections.

5. An extensible lever, comprising inner and outer longitudinally adjustable sections having overlapping portions disposed one upon another, said sections each having a plurality of equally spaced holes, certain of the holes of one section being arranged to register with different holes of the other section in different positions of adjustment of the sections, devices arranged to engage the sections within certain of the registering holes thereof to secure one section upon another, a latch for the lever, and extensible operating connections for the latch, one having a part arranged for connection with different portions of the other, said portions being spaced to correspond to the spacings of the holes of said lever sections whereby to insure equal adjustments between the lever sections and the latch operating connections.

6. An extensible lever comprising inner and outer longitudinally adjustable sections having overlapping portions disposed one upon another, each of the sections having a plurality of equally spaced abutments arranged to register one with another in different positions of adjustment of the sections, means for engaging one or more of the abutments in the different adjusted positions of the sections to secure one section upon another, a latch for the lever, and extensible operating connections for the latch, one comprising a bar having an operating member pivotally connected with the outer section of the lever, said bar having a plurality of holes therein spaced to correspond to the spacings of said abutments and also having an offset portion, the other connection extending through and guided by said offset portion and having a part arranged to engage the bar in one hole thereof in the different adjusted positions of the lever sections.

HENRY J. NEUFANG.